United States Patent Office 2,798,154
Patented July 2, 1957

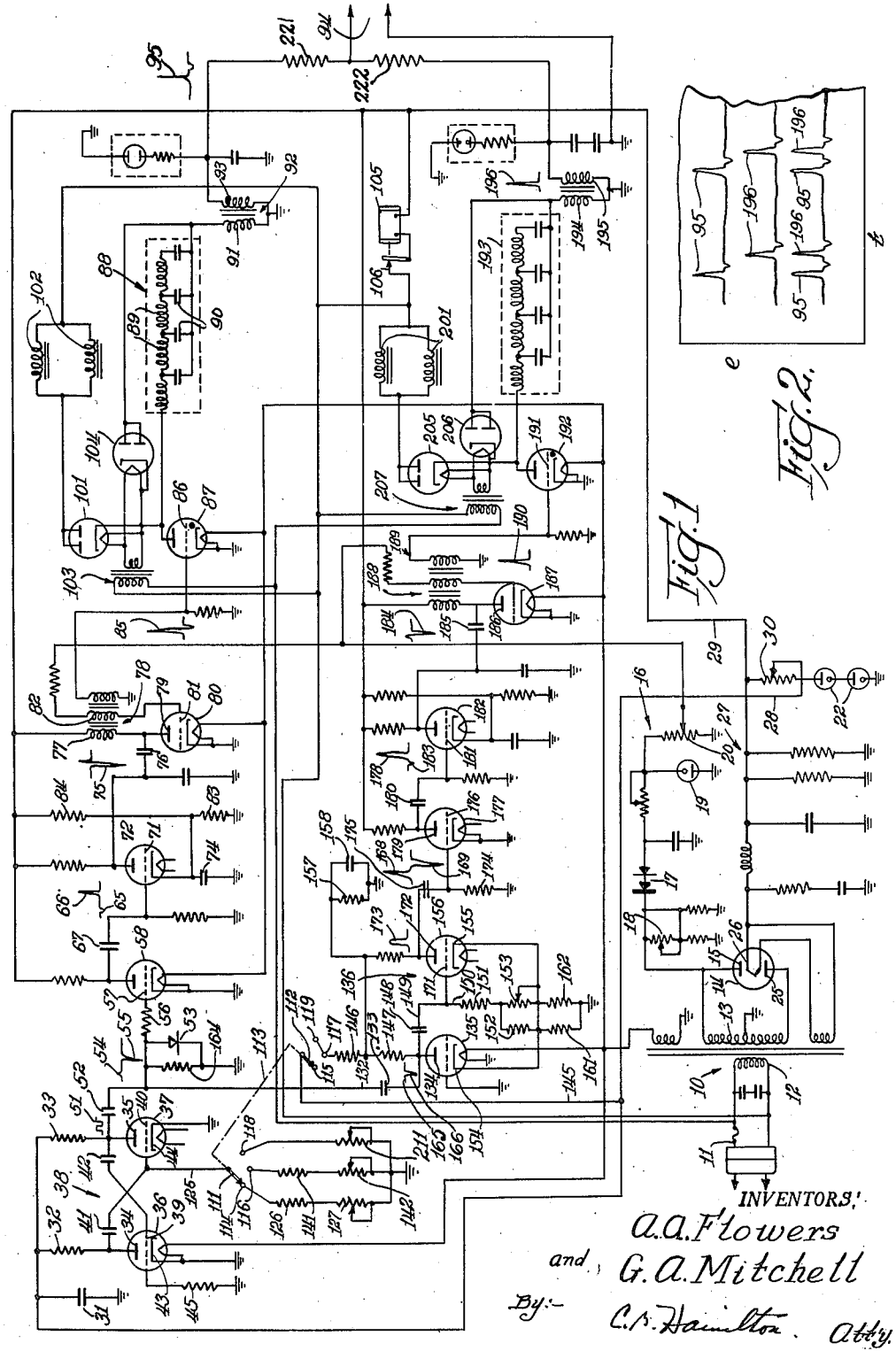

2,798,154

APPARATUS FOR FORMING PULSES

Alfred A. Flowers, Chicago, and Gerald A. Mitchell, Maywood, Ill., assignors to Western Electric Company, Incorporated, New York, N. Y., a corporation of New York Application July 13, 1953, Serial No. 367,670

5 Claims. (Cl. 250—27)

This invention relates to apparatus for forming pulses, and more particularly to apparatus for forming double pulses.

An object of the invention is to provide new and improved apparatus for forming pulses.

Another object of the invention is to provide apparatus for forming double pulses.

A further object of the invention is to provide apparatus for forming pairs of pulses spaced a predetermined period of time apart with each pulse of a pair of the pulses spaced a predetermined period of time from the other pulse of the pair.

In an apparatus illustrating certain features of the invention, there may be formed sharp pulses spaced a predetermined period of time apart. Each of these pulses is fed to differentiating and amplifying means to an output of a circuit, and the pulses also are fed to a pulse forming device which forms long pulses starting simultaneously with the pulses fed thereto and having a predetermined duration. The second pulses are fed to differentiating means which forms pulses simultaneously with the trailing ends of the second-mentioned pulses, and the pulses so formed from the trailing ends of the second-mentioned pulses are differentiated and amplified, and are fed to the output and mixed with the first pulses to form pairs of pulses spaced a predetermined period of time apart.

A complete understanding of the invention may be obtained from the following detailed description of an apparatus forming a specific embodiment thereof, when read in conjunction with the appended drawings, in which:

Fig. 1 is a diagrammatic view of a pulse-forming circuit forming one embodiment of the invention, and Fig. 2 shows several curves illustrating the pulses formed by the circuit shown in Fig. 1.

Referring now in detail to the drawings, there is shown in Fig. 1, a circuit for forming pairs of pulses periodically with the pulses of each pair spaced a predetermined distance apart. This circuit includes a transformer 10 supplied with power from an alternating voltage power line 11 connected to a primary winding 12 of the transformer. A secondary winding 13 of the transformer supplies power to a rectifier tube 14. A plate 15 of the tube 14 is connected to a conventional bias voltage circuit 16 which includes rectifiers 17, a potentiometer 18 and a voltage regulating tube 19. A second potentiometer 20 is provided for controlling bias voltage. A second plate 25 is provided in the tube 14, and a cathode 26 of the tube 14 supplies power to a voltage regulating circuit 27 of a well-known type. Conductors 28 and 29 are connected to opposite sides of a potentiometer 30 connected by gas tubes 22 to ground at one end, the conductor 28 forming a regulated B+ supply and the conductor 29 forming an unregulated B+ supply.

The conductor 28 is connected by a capacitor 31 to ground and by resistors 32 and 33 to plates 34 and 35 of tubes 36 and 37 of a free-running, multivibrator circuit 38 having grids 39 and 40 cross-connected to the plates 34 and 35 and capacitors 41 and 42, respectively. Cathodes 43 and 44 are grounded, and a resistor 45 connects the grid 39 to ground. The output plate voltage of the tube 37 forms a rectangular wave 51 which is transmitted through a condenser 52 to a crystal resistance network 53, which differentiates the wave to form a small positive pulse 54 and a large, narrow negative pulse 55 which are transmitted through a resistor 56 to a grid 57 of a tube 58. The tube 58 inverts and amplifies the pulses transmitted thereto to form short negative pulses 65 and large, narrow positive pulses 66 along with the aid of a condenser 67 through which the pulses are transmitted to a grid 71 of a tube 72.

The tube 72 inverts and amplifies the pulses 66 fed thereto to form a large, narrow negative pulse 75 and feeds this signal through a condenser 76 and a primary winding 77 of a transformer 78 connected to a plate of a tube 80 having a grid 81 controlled by a secondary winding 82 of the transformer 78. Resistors 83 and 84 and a condenser 74 provide a cathode bias to the tube 72 such that the pulse 65 is eliminated. The transformer 78 and the tube 80 form a blocking oscillator actuated by the pulse 75 to form a very large, narrow, positive pulse 85, which is applied to a grid 86 of a gas-filled trigger-type tube 87 to cause that tube to discharge a network 88 of coils 89 and capacitors 90. The discharge current flows through a primary winding 91 of a transformer 92 to induce a positive pulse in a secondary winding 93 of the transformer 92, which pulse is fed to an output 94 of the circuit.

As soon as the network 88 has discharged, the tube 87 becomes non-conductive and the network 88 is recharged through a rectifying tube 101 and choke coils 102, a transformer 103 heating filaments of the tube 101 and a rectifying tube 104. A sensitive relay 105 is provided for protective purposes to prevent abnormally high currents. The charging current passes through the sensitive relay 105 and if there is so much of a load on the relay 105 as to be dangerous to the circuit described above, the relay breaks contacts 106 to stop recharging of the network 88.

Contactors 111 and 112 of a switch 113 may be moved manually to any position in which the contactors 111 and 112 engage contacts 114 and 115, respectively, a position in which the contactors 111 and 112 engage contactors 116 and 117, respectively, and a position in which the contactors engage contacts 118 and 119, respectively. When the contactor 111 contacts the contact 114, and the contactor 112 contacts the contact 115, which is dead, the capacitor 41 and the grid 40 are connected by a conductor 125 and the contactor 111 to ground through a resistor 126 and a potentiometer 127, the potentiometer serving to adjust the frequency of the multivibrator 38. With the switch 113 in this position, pulses are fed from the multivibrator 38 to the network 53, the tube 58 and a pulse-forming, one-shot multivibrator 136 connected to the multivibrator 38 by a conductor 132 and a capacitor 133 connected to a plate 134 of a tube 135 of the pulse-forming, one-shot multivibrator 136. However, no B+ voltage is applied to the multivibrator 136 with the switch 112 in this position so the circuit produces only single pulses.

When the contactor 111 is in engagement with the contactor 116, it is connected by a resistor 141 and an adjustable potentiometer 142 to ground, and the contactor 112 connected to a conductor 145 is connected to the contactor 117 and resistors 146 and 147 connected to the plate 134 to supply B+ voltage to the multivibrator 136. The plate 134 is connected by a capacitor 148 and conductors 149 and 150 to a resistor 151, which is connected by a resistor 152 and a potentiometer 153 to cathodes 154 and 155 of the tube 135 and a tube 156, respectively. Resistors 146 and 157 and a capacitor 158 form a B+ line filter. Cathode bias resistors 161 and 162 connect the cathodes 154 and 155 to ground.

The pulse fed from the multivibrator 38 to the plate 134 of the tube 135 is differentiated by the capacitor 52, and the crystal 53 and a resistor 164 reduce the positive pulse to a very small positive pulse 165. A large negative pulse 166, the time of which is identical with the pulse 55, is being applied to the plate 134. When the negative pulse 166 is impressed on the tube 135, the potential therefrom through the capacitor 148 causes a grid 171 of the tube 156 to become more negative thereby stopping flow of current through the tube 171 to raise the potential of a plate 172 to form a pulse 173, the duration of which is dependent upon the time constant of the network including resistors 151 and 152 and the potentiometer 153 and the capacitor 148. The forward edge of the pulse 173 occurs simultaneously with the pulse 55, while the trailing edge of the short pulse 173, the left-hand edge thereof, is spaced a predetermined period of time behind the forward edge thereof.

The pulse 173 is differentiated to form a positive pulse 168 concurrent with, and, as the trailing edge of the pulse 173 is formed, a negative pulse 169 is formed and is differentiated by a capacitor 175 and a resistor 174 and is transmitted to a grid 176 of an inverting tube 177. Stopping of current through the tube 177 causes a positive pulse 173 to be transmitted from a plate 179 through the tube 177 and a capacitor 180 to a grid 181 of a tube 182 which cuts off a small negative pulse 183 and converts the positive pulse 178 to a negative pulse 184. The pulse 184 is fed through a capacitor 185 to a plate 186 of a tube 187 forming a blocking oscillator. The output of the tube 187 is fed to a transformer 188 to cause a secondary circuit 189 of the transformer 188 to send a highly amplified positive pulse 190 to a grid 191 of a trigger-type gas-filled tube 192 to fire a network 193 through a primary winding 194 of a transformer 195. A pulse 196 forming the output of the transformer 195 is transmitted to the output 94, the positive pulse 196 being spaced behind the positive pulse 95 the distance between the forward edge and the trailing edge of the pulse 173. After the network 193 is discharged, the tube 192 becomes non-conductive, and the network 193 is recharged through coils 201, the relay 105 and a rectifier tube 205 and 206, the filaments of which are connected to a transformer 207. Tubes 104 and 206 are damping diodes to prevent negative pulses being formed after the positive pulses 95 and 196. Isolating resistors 221 and 222 connect the pulses 95 and 196 to the output and are of such resistance as to isolate the pulse-forming circuit originating the other pulse from each of these pulses.

When the contactor 111 is in engagement with the contact 118, it is connected by a potentiometer 211 to ground and the contactor 112 is connected to a contact 212 which is connected to the contactor 117. In this position, the multivibrator 38 has a higher frequency than when the contactor 111 is in engagement with the contactor 116. Thus, the above-described circuit may be used whenever pairs of pulses are to be spaced apart different distances, and the time the two pulses of each pair are spaced apart may be adjusted as desired by varying the potentiometer 153 which changes the duration of the pulse 173 formed by the multivibrator 136. Thus, the above-described circuit provides a very accurate circuit for forming two pulses of the same polarity which may be spaced apart from one another any desired distance, and also permits pairs of pulses to be formed at several frequencies.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming double pulses, which comprises a free-running multivibrator for forming a square-wave voltage output, means for differentiating the voltage output to form periodically a series of sharp pulses alternately of opposite polarity, means for clipping the sharp pulses of one polarity, means for amplifying the unclipped sharp pulses of the opposite polarity, means responsive to each unclipped, sharp pulse for forming a wide pulse with the forward edge thereof concurrent with that sharp pulse and the trailing edge spaced a predetermined period of time behind the sharp pulse, means responsive to each wide pulse for forming a sharp pulse concurrent with the trailing edge of that wide pulse, means for amplifying the last-mentioned sharp pulses, and means for combining the two series of sharp pulses to form periodically occurring pairs of pulses.

2. An apparatus for forming double pulses, which comprises a free-running multivibrator for forming a square-wave voltage output, means for differentiating the voltage output to form periodically a series of sharp pulses alternately of opposite polarity, means for clipping the sharp pulses of one polarity, means for amplifying the unclipped sharp pulses of the opposite polarity, means responsive to each unclipped, sharp pulse for forming a wide pulse with the forward edge thereof concurrent with that sharp pulse and the trailing edge spaced a predetermined period of time behind that sharp pulse, means responsive to each wide pulse for forming sharp pulses concurrent with the leading edge and the trailing edge of that wide pulse, means for clipping the last-mentioned sharp pulses concurrent with the leading edges of the wide pulses, means for amplifying the sharp pulses concurrent with the trailing edges of the wide pulses, and means for combining the two series of sharp pulses to form periodically occurring pairs of pulses.

3. An apparatus for forming double pulses, which comprises a triggerable storage circuit, a second triggerable storage circuit, means for charging said storage circuits, means coupling the circuits to a load, a free-running multivibrator for producing a square voltage wave, means for differentiating the pulses of the square wave into a series of sharp, widely spaced pulses of opposite polarity, means for clipping the sharp pulses of one polarity, means responsive to each of the pulses of the opposite polarity for triggering the first storage circuit to discharge it, a one-shot multivibrator also responsive to each of the pulses of said opposite polarity for producing a wide pulse having a predetermined duration, means for forming a sharp pulse of one polarity at the start of said wide pulse, means for forming a sharp pulse of the opposite polarity at the trailing end of said wide pulse, means for clipping the sharp pulse formed at the start of the wide pulse, and means responsive to the sharp pulse formed at the trailing end of the wide pulse for triggering the second storage circuit to discharge it.

4. An apparatus for forming double pulses, which comprises a triggerable storage circuit, a second triggerable storage circuit, means for charging said storage circuits, means coupling the circuits to a load, a free-running multivibrator for producing a square voltage wave, means for differentiating the pulses of the square wave into a series of sharp, widely spaced pulses of opposite polarity, means for clipping the sharp pulses of one polarity, amplifying means responsive to each of the pulses of the opposite polarity for triggering the first storage circuit to discharge it, a one-shot multivibrator also responsive to each of the pulses of said opposite polarity for producing a wide pulse having a predetermined duration, manually operable means for adjusting the one-shot mutivibrator to vary said duration, means for forming a sharp pulse of one polarity at the start of said wide pulse, means for forming a sharp pulse of the opposite polarity at the trailing end of said wide pulse, means for clipping the sharp pulse formed at the start of the wide pulse, and amplifying means responsive to the sharp pulse formed at the trailing end of the wide pulse for triggering the second storage circuit to discharge it to the coupling means.

5. An apparatus for forming double pulses, which comprises a pair of triggerable storage circuits each including an inductance-capacitance network and a gas-filled tube, means for charging said storage circuits, means coupling the circuits to a load, a free-running multivibrator for producing a square voltage wave, means for differentiating the pulses of the square wave into a series of sharp, widely spaced pulses of opposite polarity, means for clipping the sharp pulses of one polarity, means including a blocking oscillator for amplifying the unclipped pulses, means responsive to each of the pulses of the opposite polarity for triggering one of the storage circuits to discharge it, a one-shot multivibrator also responsive to each of the pulses of said opposite polarity for producing a wide pulse having a predetermined duration, means for forming a sharp pulse of one polarity at the start of said wide pulse, means for forming a sharp pulse of the opposite polarity at the trailing end of said wide pulse, means for clipping the sharp pulse formed at the start of the wide pulse, means including a blocking oscillator for amplifying the pulses concurrent with the trailing end of the sharp pulse, and means responsive to the sharp pulse formed at the trailing end of the wide pulse for triggering the other storage circuit to discharge it.

References Cited in the file of this patent

UNITED STATES PATENTS

| 2,402,916 | Schroeder | June 25, 1946 |
| 2,402,917 | Miller | June 25, 1946 |
| 2,452,549 | Cleeton | Nov. 2, 1948 |
| 2,471,413 | Cleeton | May 31, 1949 |
| 2,537,077 | McVay et al. | Jan. 9, 1951 |
| 2,547,004 | Havens | Apr. 3, 1951 |